(12) United States Patent
Noetzold

(10) Patent No.: US 6,250,175 B1
(45) Date of Patent: Jun. 26, 2001

(54) PULL CABLE SYSTEM

(76) Inventor: Nobert Noetzold, Felixweg 7, Starnberg 82319 (DE)

( * ) Notice: Subject to any disclaimer, the term of this patent is extended or adjusted under 35 U.S.C. 154(b) by 0 days.

(21) Appl. No.: 08/973,232

(22) PCT Filed: Sep. 19, 1996

(86) PCT No.: PCT/DE96/01801

§ 371 Date: Jul. 20, 1998

§ 102(e) Date: Jul. 20, 1998

(87) PCT Pub. No.: WO97/11283

PCT Pub. Date: Mar. 27, 1997

(30) Foreign Application Priority Data

Sep. 19, 1995 (DE) ................................. 195 34 643

(51) Int. Cl.⁷ .................................................... F16C 1/10
(52) U.S. Cl. .................... 74/502.3; 74/502.4; 74/502.6
(58) Field of Search ......................... 74/500.5–502.6

(56) References Cited

U.S. PATENT DOCUMENTS

| | | | |
|---|---|---|---|
| 1,746,719 | 2/1930 | Sneed . | |
| 1,772,453 | 8/1930 | Bosworth . | |
| 1,916,896 | * 7/1933 | Sneed ................................. | 74/502.3 |
| 1,939,766 | * 12/1933 | Corset ................................. | 74/502.3 |
| 2,441,719 | * 5/1948 | Potter ................................. | 74/502.3 |
| 3,096,962 | * 7/1963 | Meijs ............................. | 74/502.3 X |
| 3,298,243 | * 1/1967 | Geissler et al. ................. | 74/501.5 R |
| 3,494,214 | * 2/1970 | Egli ..................................... | 74/502.3 |
| 3,546,961 | * 12/1970 | Marton ............................ | 74/502.3 X |
| 3,625,077 | * 12/1971 | Bernard et al. ..................... | 74/89.21 |
| 3,858,578 | * 1/1975 | Milo ...................................... | 128/20 |
| 3,927,899 | * 12/1975 | Bough ................................ | 280/87 A |
| 4,102,219 | * 7/1978 | Plamper ................................. | 74/502 |
| 4,356,737 | * 11/1982 | Burghoff et al. ................. | 74/506 X |
| 4,380,178 | * 4/1983 | Bennett et al. ..................... | 74/502.4 |
| 5,091,141 | 2/1992 | Feuollet . | |
| 5,174,164 | * 12/1992 | Wilheim ............................. | 73/856.5 |
| 5,448,926 | * 9/1995 | Reasoner ............................. | 74/500.5 |

FOREIGN PATENT DOCUMENTS

| | | | |
|---|---|---|---|
| 225753 A1 | * 8/1985 | (DE) ................................. | 74/502.3 |
| 358269 | 2/1906 | (FR) . | |
| 647162 | 11/1928 | (FR) . | |
| 674990 | 2/1930 | (FR) . | |

* cited by examiner

Primary Examiner—Vinh T. Luong
(74) Attorney, Agent, or Firm—Roylance, Abrams, Berdo & Goodman, L.L.P.

(57) ABSTRACT

A pull cable system, includes a cable for transmitting a tensile force, a flexible tube for accommodating the cable, and a casing surrounding the tube for absorbing a pressure force. The casing is composed of a plurality of form-parts so joined to one another as to form a continuous axial passageway which is defined by an inside dimension. The form-parts are so configured that abutting end faces between successive form-parts have a complementary configuration to thereby enable a disposition of the casing along an arcuate path, with the tube being defined by an outside dimension corresponding to the inside dimension of the passageway.

4 Claims, 3 Drawing Sheets

FIG.1
FIG.2
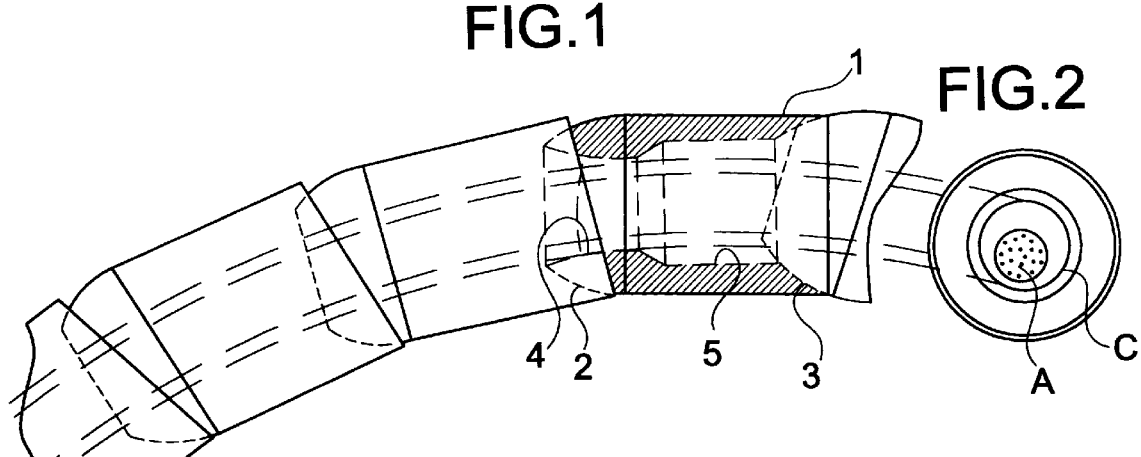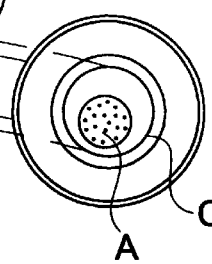
FIG.3
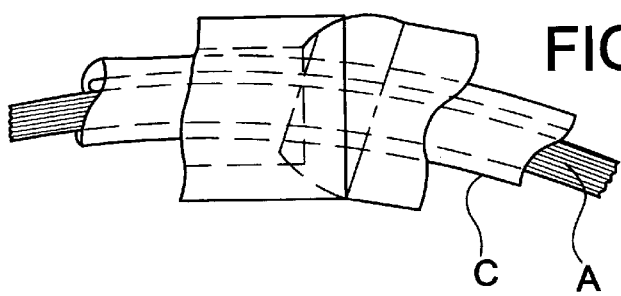
FIG.4
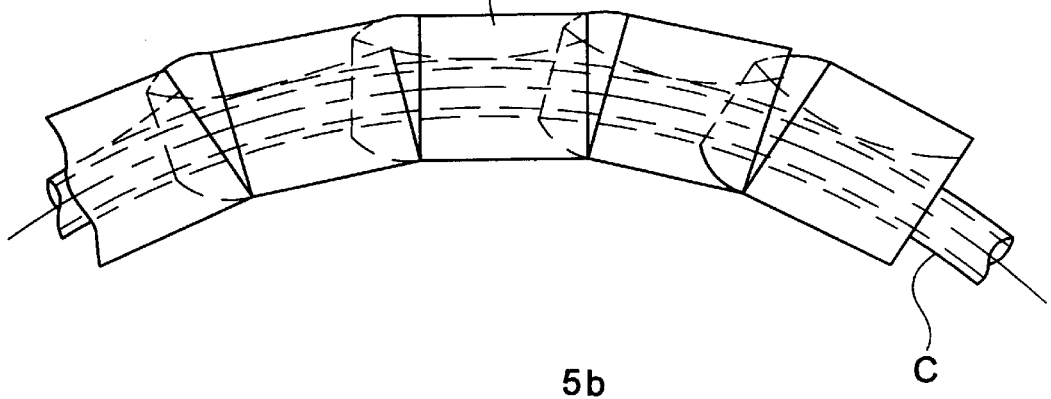
FIG.5
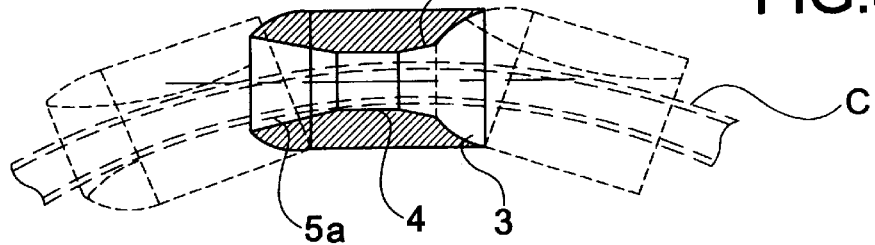

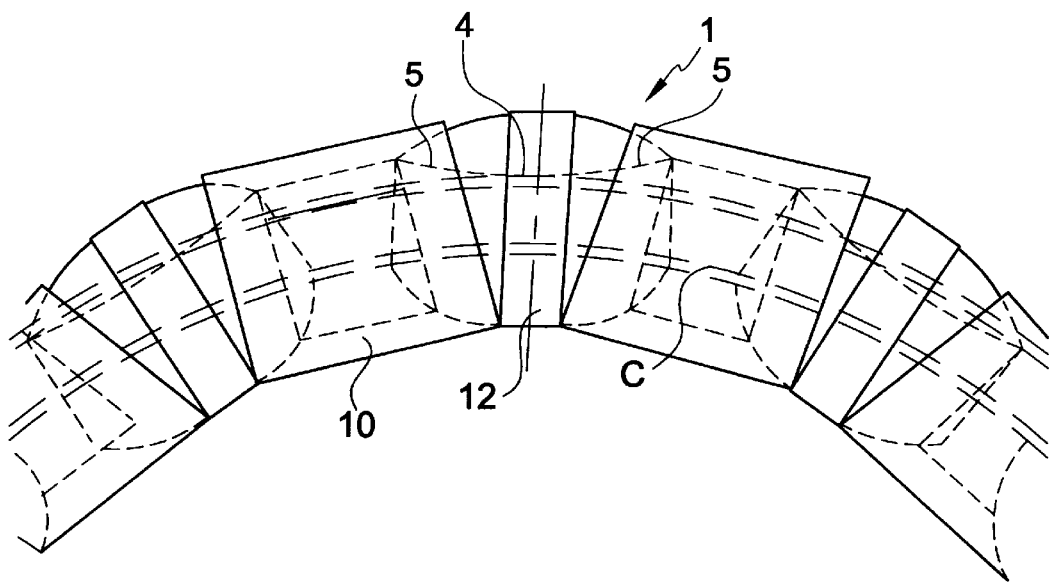
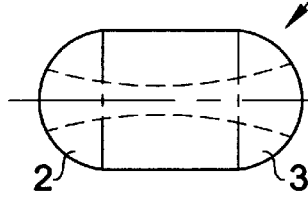 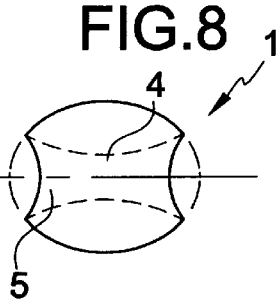 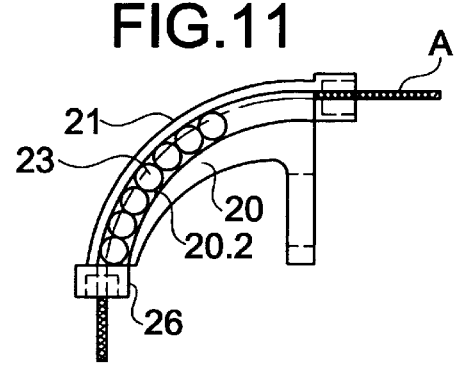
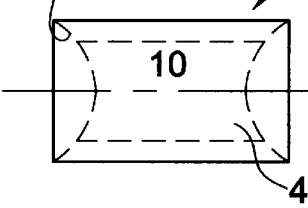 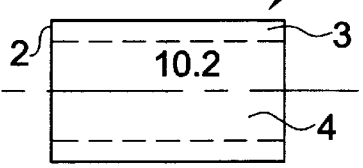 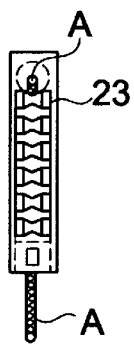
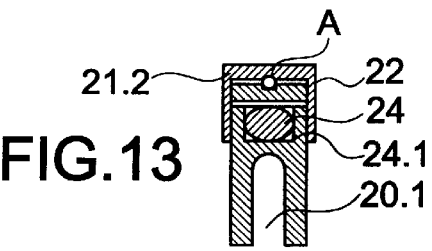 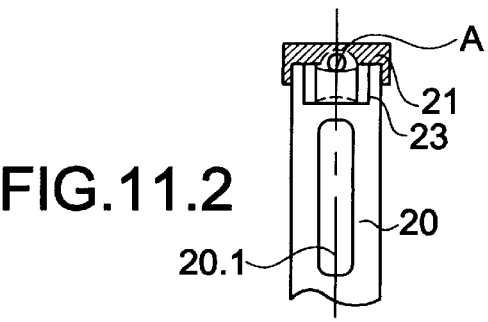

FIG.12
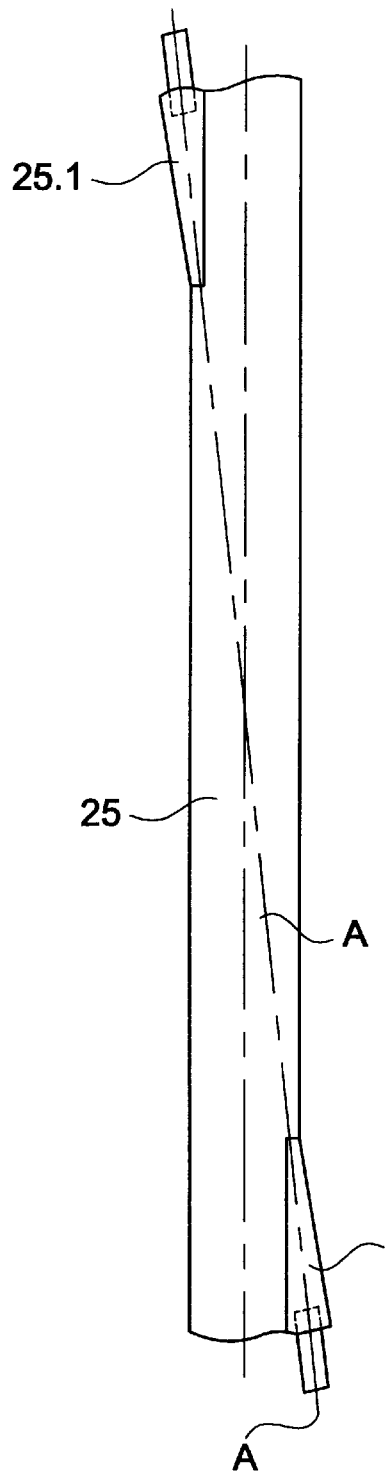
FIG.12.1
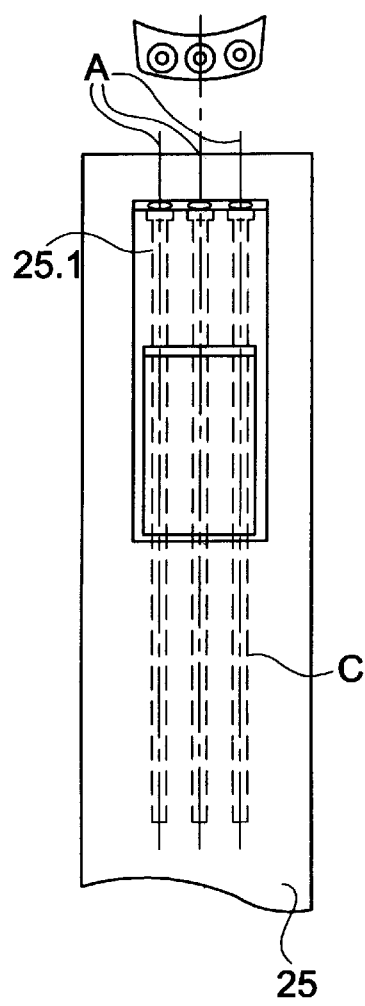
FIG.12.2
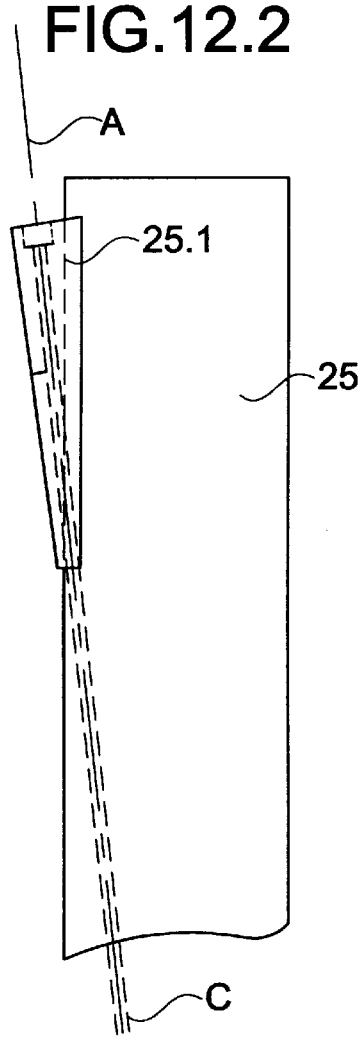

PULL CABLE SYSTEM

BACKGROUND OF THE INVENTION

The invention relates to a pull cable system of a type having a cable for transmitting a pull force and a housing enclosing the cable for absorbing a pressure force, whereby the housing is comprised of a plurality of form-parts so joined to one another as to form a continuous axial throughbore and to enable an arcuate disposition of the housing.

The so-called Bowden pull wire that basically consists of a coiled steel wire casing and is traversed by a pull cable transmitting pull forces in a flexible manner without deflection rollers, compensating holders and supports is preferably used for operating the brakes or switching the gears of a bike.

The disadvantage of the Bowden pull wire is its coiled steel wire construction. When the wire is disposed in a curve, there are two differently stretched lengths to be compensated by forming slits at the outer radius by means of the resiliently coiled steel wire construction. When the pull cable is actuated, the compensating force can be supported only at the inner radius, which has the effect of pulling the Bowden pull wire into a stretched position. This can be prevented by the pull cable imposing this forced position. The result is a high friction resistance. The stronger the pull cable is being drawn, the larger is the friction resistance, the more ineffective is the force transmission, which presents a major disadvantage with regard to braking operations.

The variation in lengths occurring when bending the pull cable presents such a disadvantage that the Bowden pull wire is hardly suited for precise chain or hub gear shifting.

A narrow disposition of curves is not possible, which requires an unnecessary addition of length of the Bowden pull wire and thus causes higher costs, provides a disadvantageous optical appearance and long paths and thus hardly allows controlled dispositions.

SUMMARY OF THE INVENTION

It is an object of the present invention to provide an improved pull cable system in which the friction resistance is minimized and which exhibits a better directional stability, a much narrower and tension-free disposition in curves, a reduction of the contact surfaces of the pull cable by 75% and a removal of sliding restraints, as well as better armoring and sealing against outer influences.

According to the present invention, this object is solved by a pull cable system which includes a cable for transmitting a tensile force, a flexible tube for accommodating the cable, and a casing surrounding the tube for absorbing a pressure force, whereby the housing is composed of a plurality of congruent form-parts so joined to one another as to form a continuous axial passageway which is defined by an inside dimension, with the form-parts being so configured that abutting end faces between successive form-parts have a complementary configuration to thereby enable a disposition of the housing along an arcuate path, wherein the tube is defined by an outside dimension corresponding to the inside dimension of the throughbore.

Preferably, each of the form-parts has opposite end faces, with one of the end faces having a concave configuration and the other one of the end faces having a convex configuration. Thus, in accordance with the present invention, the coiled steel wire casing utilized in a conventional Bowden cable is replaced by joined complementary form-parts which permit transmission of great pressure forces by way of a ball pan configuration of adjoining end faces of successive form-parts.

BRIEF DESCRIPTION OF THE DRAWING

The above and other objects, features and advantages of the present invention will now be described in more detail with reference to the accompanying drawing in which:

FIG. 1 is a general, partially sectional illustration of a first embodiment of a pull cable system according to the present invention;

FIG. 2 is a cross sectional view of the pull cable system of FIG. 1;

FIG. 3 is a cutaway view of the pull cable system of FIG. 1;

FIG. 4 is a general illustration of a second embodiment of a pull cable system according to the present invention;

FIG. 5 is a partially cutaway view of the pull cable system of FIG. 4;

FIG. 6 is a general illustration of a third embodiment of a pull cable system according to the present invention showing first and second type form parts, the first type form part having a cylindrical collar;

FIGS. 7 to 10 shows side views of form-parts having formed therein different configurations of an axial throughbore;

FIG. 11 is a general illustration of a frame assembly containing a curved arrangement of a pull cable system according to the present invention;

FIG. 11.1 is a rear section view in a vertical plane of the frame assembly of FIG. 11;

FIG. 11.2 is a front section view in a vertical plane of the frame assembly of FIG. 11;

FIG. 12 is a general illustration of a frame tube accommodating a pull cable system, in diagonal extension, according to the present invention;

FIG. 12.1 is a cutaway side view of the pull cable system of FIG. 12;

FIG. 12.2 is a cutaway top view of the pull cable system of FIG. 12; and

FIG. 13 is a cutaway view, in cross section, of an attachment of a pull cable system to a frame assembly.

DETAILED DESCRIPTION OF PREFERRED EMBODIMENTS

Turning now to the drawing, and in particular to FIGS. 1 to 3, there are shown general, partially sectional illustrations of a first embodiment of a pull cable system according to the present invention, including a plurality of form-parts 1 joined to one another in-end-to-end relationship and threaded on a flexible support tube C. Each of the form-parts 1 has one end face to define a support surface 2 of a convex spherical curvature, while the opposite end face is configured as a concave opening 3 in the form of a ball pan being congruent to the support surface 2. The joined form-parts 1 fit congruently surface 2 in surface 3, which allows a narrow disposition of curves with little friction, as the different lengths are compensated by the spherical shape. Thus, the form-parts 1 can be deflected in central direction but can be lined up along the support tube C to exhibit a continuous curved path.

The form-parts 1 are provided interiorly with a bore 4 so that the arrangement of successive form-parts 1 provide a continuous passageway for receiving a pull cable A. The bore 4 of each form-part 1 has an inside dimension which corresponds to the outside dimension of the support tube C. As shown by way of example in FIGS. 7 to 10, the bores 4 of the form-parts 1 may also have different configuration, with FIG. 7 showing a form-part 1 with opposite convex support surfaces 2, 3, with FIG. 8 showing a ball-shaped form-part 1, with FIG. 9 showing a form-part 1 with concave support surface and cylindrical bore 4, and with FIG. 10 showing a form-part 1 with flat end faces 2, 3 and cylindrical bore 4.

Suitably, the form-parts 1 are so configured that one of the end faces 2, 3 has a concave configuration and the other one of the end faces has a convex configuration. It is also possible to alternate a first type of form-parts having convex end faces with a second type of form-parts having concave or ring-shaped end faces, whereby the inside dimension of the first type of form-parts corresponds to the cross section of the tube C while the bore 4 of the second type of form-parts has an inside dimension which exceeds the cross section of the tube C.

As shown in FIG. 1, the form-part 1 may also be provided with a central recess 5 to exhibit a free space. If the pull cable A is drawn, the compensating support casing made from the joined threaded form-parts does not press against the cable A to realize a smooth transmission. The form-parts 1 may be made of metal, in particular of anodized aluminum, but can also be made of ceramic or plastic material that has advantageously been shaped to the form-parts 1 by injection moulding.

In order to improve their handling, the individual form-parts 1 should be threaded onto a smooth plastic tube to realize a continuous strand, which is of advantage with respect to easy handling and marketing. Also, the joined form-parts 1 may be additionally covered by a hose (not shown) to realize a stable and bendable unit.

FIGS. 4 and 5 show a further embodiment of a pull cable system which differs from the embodiment of FIGS. 1 to 3 in the configuration of the passageway 4. Each form-part 1 has on one end face 3 formed as a pan for receiving the adjacent, approximately ball-shaped end face of an adjoining form-part 1. The form-parts 1 are provided with free spaces 5a, 5b for enabling a continuous course of the support tube C along a curved path.

FIG. 6 is a general illustration of another embodiment of a pull cable system according to the present invention, including form-parts 1 with cylindrical collar 12.

The form-parts 1 may be made of glidable material. It is also conceivable to omit the provision of the support tube C altogether, when using form-parts of sufficient length and of glidable material so that the cable A for transmitting tensile forces is supported directly by the throughbore 4 of the form-parts 1.

Another embodiment of the force transmission with little friction is the partly unsupported arrangement of the pull cable between supports fastened to a frame assembly, as shown in FIGS. 11, 11.1 and 11.2. For the deflection of force (disposition of curves), the pull cable A is guided over attachable ball or roller bearings of a curve segment 20 of the frame assembly. Two types of bearings may be used: the roller bearing 23 or the ball bearing 24. Both show an only small loss of force due to minimized friction.

Another way of disposing the pull cable with minimized friction values may be achieved by disposing the pull cables A diagonally in a frame tube or assembly 25 which extends between a cable inlet fitting 25.1 and a cable outlet fitting 25.2, as shown in FIGS. 12, 12.1 and 12.2. This can also be achieved by retrofitting, i.e., by arranging one or more (plastic) tube/tubes from the cable inlet 25.1 to the cable outlet 25.2 and by gluing them to the outlets at the respective end face such that the cable A is easy to be disposed in order to traverse the tube 25 diagonally, so as to leave the end of the tube without friction or contact via the cable outlet 25.2. Thus, there will not be any contact with the tube. This method has the advantage that neither a noisy striking of the cable A against the frame tube 25 nor increased friction values will occur.

As shown in FIG. 13, the curve segment 20 is further provided with a sliding and support ring 22 positioned between the cable A and the rollers 24 and having a groove for receiving the cable A. A cover cap 21.2 envelops around the cable A and the ring 22 and is attached to the curve segment 20. The ring 22 is also formed with a groove for receiving the cable A and has an inside diameter equal to the sum of inner radius of the running surface 24.1 of the segment 20 and the diameter of the ball 24.

What is claimed as new and desired to be protected by Letters Patent is set forth in the appended claims:

1. A flexible tensile force transmitting cable system, comprising:
   a cable for transmitting a tensile force;
   a flexible tube receiving said cable for axial movement and having an outside dimension; and
   a casing surrounding said tube, said casing including a plurality of form-parts joined to one another to form a continuous axial passageway defined by an inside dimension of varying diameters, said form-parts comprising a first set of form-parts alternately joined to a second set of form-parts, said first set of form-parts having opposite convex end faces, said second set of form-parts having opposite end faces, each having one of a concave shape and an annular shape, each of said first set of form-parts having an inside dimension corresponding to a cross section of said tube, said passageway in said second set of said form-parts having an inside dimension exceeding the cross section of said tube, said form-parts having abutting end faces between adjacent form-parts with complementary configurations enabling dispositions of said casing along accurate paths, each dispositions of said casing along arcuate paths, each of said form-parts having an interior recess forming a section of said axial passageway with an interior diameter exceeding said outside dimension of said tube.

2. A flexible tensile force transmitting cable system, comprising:
   a cable for transmitting a tensile force;
   a flexible tube for receiving said cable for axial movement of said cable and having an outside diameter; and
   a casing surrounding said tube, said casing including a plurality of form-parts joined to one another to form a continuous axial passageway defined by an inside dimension of varying diameters, said form-parts including a first set of form-parts alternately joined to a second set of form-parts, said first set of form-parts having opposite convex end faces, said second set of form-parts having opposite end faces, each having one of a concave shape and an annular shape, each of said first set a form-parts having a circumferential cylindrical collar centrally located thereon, said form parts having abutting end faces between adjacent form-parts with complementary configurations enabling dispositions of said casing along arcuate paths, each of said form-parts having an interior recess forming a section of said axial passageway with an interior diameter exceeding said outside dimension of said tube.

3. A flexible tensile force transmitting cable system, comprising:

a cable for transmitting a tensile force;

a flexible tube for accommodating the cable; and a casing surrounding said tube for absorbing a pressure force, said casing including a plurality of form-parts joined to one another to form a continuous axial passageway defined by an inside dimension of varying diameters, said form-parts having abutting end faces between successive form-parts with complementary configurations enabling dispositions of said casing along an arcuate path, said form-parts comprising first and second sets of form parts, said tube having an outside dimension corresponding to an inside dimension of the passageway, each of said form parts having an interior recess forming a section of said axial passageway with an interior dimension with a diameter exceeding that of the tube for creating a space for compensatory movement of said tube within said axial passageway when the cable therein transmits a tensile force, each of said first set of form-parts having an inside dimension corresponding to a cross section of said tube, with said axial passageway in said second set of form-parts having an inside dimension exceeding the cross-section of said tube.

4. A flexible tensile force transmitting cable system, comprising:

a cable for transmitting a tensile force, said cable extending diagonally through a frame assembly;

fittings securing said cable system at opposite ends of said frame assembly;

a flexible tube for accommodating the cable; and a casing surrounding said tube for absorbing a pressure force, said casing including a plurality of form-parts joined to one another to form a continuous axial passageway defined by an inside dimension of varying diameters, said form-parts having abutting end faces between successive form-parts with complementary configurations enabling dispositions of said casing along an arcuate path, said tube having an outside dimension corresponding to an inside dimension of the passageway, each of said form parts having an interior recess forming a section of said axial passageway with an interior dimension with a diameter exceeding that of the tube for creating a space for compensatory movement of said tube within said axial passageway when the cable therein transmits a tensile force.

* * * * *